(12) United States Patent
Wu (10) Patent No.: US 8,538,802 B2
(45) Date of Patent: Sep. 17, 2013

(54) SYSTEM AND METHOD FOR BUILDING A COMMUNICATION LINK

(75) Inventor: Jen-Chang Wu, Taipei (TW)

(73) Assignee: Shih Pi Ta Technology Ltd., Taipei (TW)

( * ) Notice: Subject to any disclaimer, the term of this patent is extended or adjusted under 35 U.S.C. 154(b) by 472 days.

(21) Appl. No.: 12/876,306

(22) Filed: Sep. 7, 2010

(65) Prior Publication Data

US 2011/0064211 A1  Mar. 17, 2011

(30) Foreign Application Priority Data

Sep. 11, 2009  (TW) ................................ 98130780 A
Dec. 30, 2009  (TW) ................................ 98145891 A (51) Int. Cl.
*G07B 15/00* (2011.01)
*G08G 1/123* (2006.01)
*G01C 21/00* (2006.01)

(52) U.S. Cl.
USPC .............................. 705/13; 340/992; 701/482

(58) Field of Classification Search
USPC .................. 379/88.17–88.25, 201.01; 705/1, 705/13; 340/988, 991–992, 10.32
See application file for complete search history.

(56) References Cited

U.S. PATENT DOCUMENTS

| 5,711,011 | A | 1/1998 | Urs et al. |
| 6,711,500 | B2 * | 3/2004 | Chen ............................. 701/482 |
| 6,756,913 | B1 * | 6/2004 | Ayed ............................. 340/992 |
| 2002/0131380 | A1 | 9/2002 | Panchal et al. |
| 2003/0176967 | A1 * | 9/2003 | Chen ............................. 701/213 |
| 2003/0177062 | A1 * | 9/2003 | Chen ............................. 705/13 |

FOREIGN PATENT DOCUMENTS

| JP | 2001-237967 | 8/2001 |
| JP | 2001-331562 | 11/2001 |
| TW | 475321 | 2/2002 |
| TW | 200519632 | 6/2005 |
| WO | 2009079469 A1 | 6/2009 |

* cited by examiner

Primary Examiner — Mohammad Islam
(74) Attorney, Agent, or Firm — CKC & Partners Co., Ltd.

(57) ABSTRACT

This invention discloses a method to build a communication link between a client and a customer service of the dispatching company. The dispatching company has a plurality of dispatch lists, each dispatch list records a code of a client and a code of a customer service that provides service to the client. The method comprises: gathering a telephone number of a client; gathering a code of the client based on the telephone number; searching a dispatch list from the plurality of dispatch lists based on the code of the client; gathering a code of a customer service recorded in the dispatch list; gathering a telephone number of the customer service based on the code of the customer service; and dialing the telephone number of the customer service to build a communication link between the client and the customer service.

38 Claims, 3 Drawing Sheets

SYSTEM AND METHOD FOR BUILDING A COMMUNICATION LINK

RELATED APPLICATIONS

This application claims priority to Taiwan Application Serial Number 98130780, filed Sep. 11, 2009, and Taiwan Application Serial Number 98145891, filed Dec. 30, 2009 which are herein incorporated by references.

BACKGROUND

1. Field of Invention

The present invention relates to a communication method and apparatus thereof. More particularly, the present invention relates to a communication method and apparatus thereof between clients and corresponding attendants.

2. Description of Related Art

In daily life a taxi is a convenient mode of transportation. A person can call a taxi to pick him up anywhere, at any time.

Typically, when a client calls a taxi service and tells the taxi driver to go to a position to pick up him, if the taxi driver is unfamiliar with the address, the taxi driver needs to communicate with the client to ask how to go to the position. Or, when a client calls a taxi service and tells the taxi driver to go to a position to pick up him, if the client wants to change the position, the client needs to communicate with the taxi driver to change the position. In other words, the communication between the client and the taxi driver often happens. However, for the client, the taxi driver is an unknown person. On the other hand, for the taxi driver, the client is an unknown person. Therefore, how to protect the private matter of client from the taxi driver and protect the private matter of taxi driver from the client is an important problem.

Typically, for protecting private matter, when the client wants to communicate with the taxi driver, or the taxi driver wants to communicate with the client, an operator in the dispatching company takes charge of building a communication between the client and the taxi driver. Such method costs manpower. Moreover, in such method, the client needs to memorize the code of the taxi driver or the code of the taxi, otherwise the operator can not help the client to find the corresponding taxi driver.

Therefore, a method and apparatus thereof is needed to solve the foregoing problems.

SUMMARY

This invention discloses a method to build a communication link between a client and a customer service of the dispatching company. The dispatching company has a plurality of dispatch list, each dispatch list records a code of a client and a code of a customer service that provides service to the client. The method comprises: gathering a telephone number of a client; gathering a code of the client based on the telephone number; searching a dispatch list form the plurality of dispatch list based on the code of the client; gathering a code of a customer service recorded in the dispatch list; gathering a telephone number of the customer service based on the code of the customer service; and dialing the telephone number of the customer service to build a communication link between the client and the customer service.

In an embodiment, the step of gathering a telephone number of a client further comprises to inform the client to input a telephone number of the client.

In an embodiment, when the telephone number of the client is not recorded in any one of the dispatch lists, the method further comprises to inform the client to input another telephone number of the client.

In an embodiment, each dispatch list further records a position for a customer service providing service to a client and a time or a customer service providing service to a client, and when two or more dispatch lists of the plurality of dispatch lists are searched out, the method further comprises to provide information of a position for the customer service providing service to the client or a time or the customer service providing service to the client to the client to select one of the two or more dispatch lists.

In an embodiment, when a communication link is built between the client and the customer service, the method further comprises to record the talk between the client and the customer service.

This invention further discloses a method to build a communication link, wherein a customer service of a dispatching company dials a service telephone number of the dispatching company to build a communication link with a client, wherein the dispatching company has a plurality of dispatch list, each dispatch list records a code of a client and a code of a customer service who provides service to the client, comprising: gathering a telephone number of a customer service; based on the telephone number of the customer service to gather a code of the customer service; based on the code of the customer service to search a dispatch list form the plurality of dispatch list; gathering a code of a client recorded in the dispatch list; based on the code of the client to gather a telephone number of the client; and dialing the telephone number of the client to build a communication link between the client and the customer service.

In an embodiment, the step of gathering a telephone number of a customer service further comprises to inform the customer service to input a telephone number of the client.

In an embodiment, the method further comprises to determine a telephone number received by the dispatching company whether or not belongs to a customer service of the dispatching company.

In an embodiment, when the telephone number received by the dispatching company does not belong to a customer service of the dispatching company, the method further comprises to inform the customer service to input another telephone number of the customer service.

In an embodiment, each dispatch list further records a position for a customer service providing service to a client and a time or a customer service providing service to a client, wherein when two or more dispatch lists of the plurality of dispatch lists are searched out, the method further comprises to provide information of a position for the customer service providing service to the client or a time or the customer service providing service to the customer service to the client to select one of the two or more dispatch lists.

This invention further discloses an apparatus to build a communication link between a client and a customer service of a dispatching company, comprising: a communication system for receiving a call; a search server; a building communication link server; and a database having a plurality of dispatch list of the dispatching company, each dispatch list records at least two codes of a client and a code of a customer service who provides service to the client, wherein the search server gathers a telephone number of a caller, and from the database to gather a code of the caller based on the telephone number, and search a dispatch list from the plurality of dispatch list based on the code of the caller, and gather a code of a corresponding person recorded in the dispatch list, and gather a telephone number of the corresponding person; wherein the building communication link server dials the telephone number of the corresponding person to build a communication link between the caller and the corresponding person.

In an embodiment, the caller is a client and the corresponding person is a customer service.

In an embodiment, the caller is a customer service and the corresponding person is a client.

In an embodiment, each dispatch list further records a position for a customer service providing service to a client and a time or a customer service providing service to a client, wherein when two or more dispatch lists of the plurality of dispatch lists are searched out, the method further comprises to provide information of a position for the customer service providing service to the client or a time or the customer service providing service to the customer service to the client to select one of the two or more dispatch lists.

Figure 3:
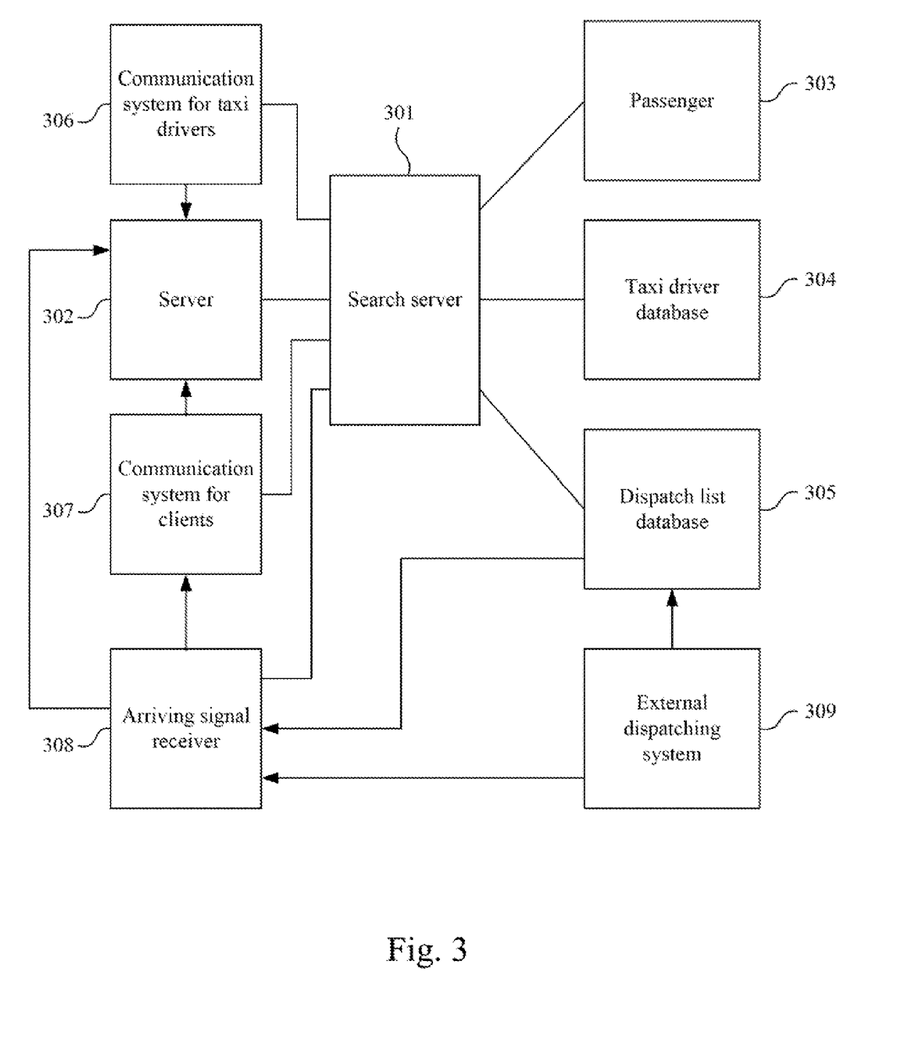
FIG. 3 illustrates an apparatus for building a communication link between the passengers and the taxi drivers.

In an embodiment, a customer service of a dispatching company communicates with a client just to tell the client that he has arrived. In this case, it is not necessary for the customer service to really talk with the client. For example, an information of the taxi (customer service) arrived the assigned position is informed to the passenger (client). It is not necessary for the passenger to response this information. Accordingly, the invention gathers a signal that is sent from a communication apparatus of the customer service to the external dispatching system 309 when he arrives the assigned position. This signal will renew the content of whether or not arrived the assigned position in dispatch list. This signal will trigger the server 302 uses a special telephone number to dial to the client to build a communication link between the customer service and the client. Before the client answers the phone, the communication link is cut but the special telephone number is displayed in the communication apparatus of the client. That is, the special telephone number is used as an information to tell the client that the customer service has arrived. When the client recall the special telephone number, the information that the customer service has arrived is informed to the client and a selection of building a communication link with the customer service is provided to the client.

As aforementioned, the invention provides the following advantages. It is not necessary for a passenger to communicate with a taxi driver through an operator of the dispatching company. It is also not necessary for a taxi driver to communicate with a passenger through an operator of the dispatching company. It is also not necessary for a passenger to memorize a code of a taxi driver to communicate with the taxi driver. Therefore, the method can save the time of the passenger and taxi driver and reduce the manpower requirement. Moreover, because the communication link between the passenger and the taxi driver are built automatically, the private matter, such as the telephone number, can be protected. On the other hand, when a communication link is built between the passenger and the taxi driver, an automatic recording process is started to record the talk between the passenger and the taxi driver to ensure a service quality.

BRIEF DESCRIPTION OF THE DRAWINGS

The invention can be more fully understood by reading the following detailed description of the embodiment, with reference made to the accompanying drawings as follows.

DETAILED DESCRIPTION

An automatic connection method is used in the claimed invention. According to this method, a first person can dial a fixed telephone number and input conditions, then, this system can search a second person based on the conditions and build a communication between the first person and the second person. Only the fixed telephone number is disclosed to the public in this method. Therefore, this method can protect the private matter of the first person and the second person from the public. Moreover, an operator is not involved to build this communication between the first person and the second person. Therefore, a velocity of building this communication is improved.

This method not only can build a communication between a driver and a passenger but also can build a communication between a client and a customer service for protecting private matter of both, such as to build a communication between a client and a deliveryman, between a client and a maintenance worker and so on. Especially, the private matter of this client protection is very important when a customer service for this client is a temporary staff member. The following embodiment is to build a communication between a driver and a passenger.

Figure 1:
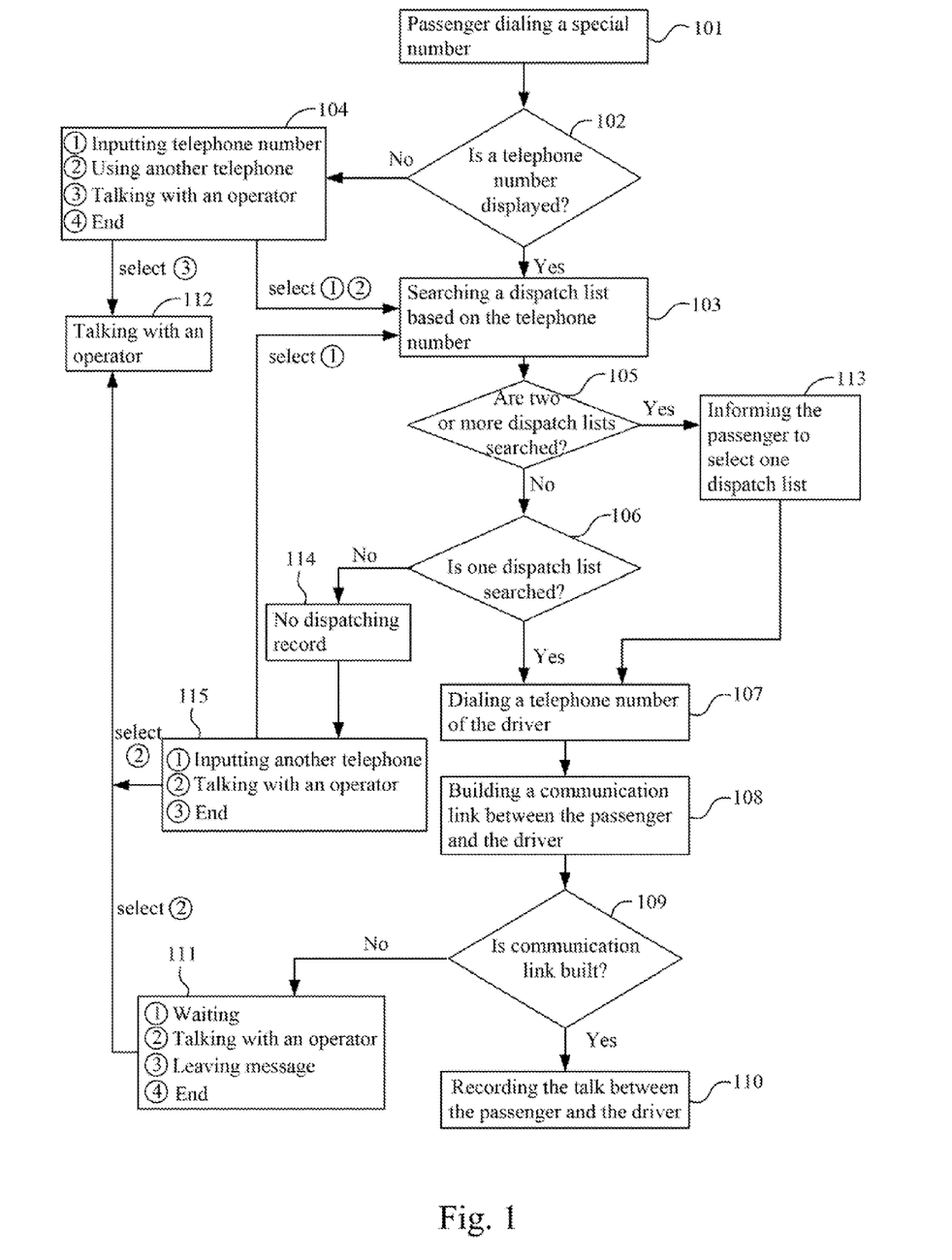
FIG. 1 is a flowchart of a passenger to build a communication with a driver.

FIG. 1 is a flowchart of a passenger to build a communication with a driver. This flow chart is to describe how to build a communication between a taxi driver and a passenger automatically when this passenger wants to communicate with this arranged taxi driver after a dispatching company has arranged a taxi driver to the passenger. On the other hand, a dispatch list is generated by the dispatching company after this dispatching company dispatches a taxi to serve a passenger. This dispatching list records a dispatching result, a code of this passenger, a code of this dispatched taxi driver, a time to generate this dispatch list, a telephone number of this passenger, a telephone of the dispatched taxi driver, a position to pick up this passenger, a predetermined time to pick up this passenger and so on. In an embodiment, the code of the passenger is a telephone number of the passenger, and the code of the dispatched taxi driver is a telephone number of the dispatched taxi driver.

In step 101, when this passenger wants to contact this dispatched taxi driver, this passenger can dial a special telephone number. This special telephone number is set, for example, by this dispatching company to provide passengers to communicate with taxi drivers who are dispatched by this dispatching company. Moreover, this special telephone number and the telephone number for a passenger calling a taxi of this dispatching company can be the same. Accordingly, when a passenger use his telephone to dial this telephone number for a taxi and the passenger's telephone number is gathered by this dispatching company, a system can search a dispatch list related to this passenger's telephone number. When the searched dispatch list shows a dispatching result that is unfinished, the system can provide a selection item of communicating with the dispatched taxi driver automatically to the passenger. On the other hand, when a passenger uses his telephone to dial this telephone number for a taxi and the passenger's telephone number is not gathered by this dispatching company, the system can not provide a selection item of communicating with the dispatched taxi driver automatically to the passenger. In another embodiment, this special telephone number and the telephone number for a taxi driver calling this dispatching company can be the same.

Next, in step 102, a detection process is performed to determine whether a telephone number is displayed in a communication system of a dispatching company. For example, a communication system detects caller information whether it includes a telephone number. Because this detection process is performed by a communication system of the dispatching company, the customer service, such as the dispatched taxi driver, can not know the passenger's telephone number.

In step 103, when the caller information includes a telephone number, a searching process is performed to search a dispatch list related to the telephone number. That is, a code of this passenger is gathered based on the passenger's telephone number. Then, the dispatch list recording this code of this passenger is searched from a plurality of dispatch lists. In another embodiment, the method of searching dispatch list further comprises to mark the dispatching list code in the passenger's record or to mark the dispatching list code in the taxi driver's record when the dispatching list is generated to improve the searching velocity.

In contrast, in step 104, when the caller information does not include a telephone number, the system provides the following selection items to the passengers. For example, the passenger can manually input his telephone number to the system, the passenger can use another telephone that can display telephone number to communicate with the dispatching company. The passenger can communicate with an operator to help him. Or, the passenger can end this call a taxi driver process.

When the passenger selects to manually input his telephone number to the system in step 104, the step 103 is performed again to search a dispatch list related to the telephone number. That is, a code of this passenger is gathered based on the passenger's telephone number. Then, the dispatch list recording this code of this passenger is searched from a plurality of dispatch lists. On the other hand, when the passenger selects to communicate with an operator to help him, an operator of this dispatch company can talk with him directly in step 112.

Next, in step 105, a determination process is performed to determine whether two or more dispatch lists are searched out or not. When a passenger calls taxi service many times, many dispatch lists are generated because each time the taxi service is called it can generate a dispatch list. Accordingly, it is possible for the system to search out two or more dispatch lists related to the passenger code in step 105. Accordingly, when step 105 determines two or more dispatch lists are searched out, step 113 is performed to pronounce these dispatch lists respectively to provide the caller to select one of the dispatch lists. For example, when a passenger calls taxi service two times in a time period, and when the passenger wants to communicate with the taxi driver who is not the driver who provided service the last time, the system will search the dispatch lists related to the code of the passenger in a special time period and pronounces content of these searched out dispatch lists respectively to provide the caller to select one of the dispatch lists. In an embodiment, the system can pronounce the position to pick up this passenger or the time to pick up this passenger to provide the caller to select one of the dispatch lists.

In step 107, when the caller selects one of the dispatch lists, the telephone number of the taxi driver recorded in the selected dispatch list is called. In an embodiment, the code of the taxi driver is gathered, then, the telephone number is gathered based on the code of the taxi driver. In another embodiment, the code of the taxi driver is prounced to inform the caller. In step 108, a communication link is built between the caller and the taxi driver.

On the other hand, when two or more dispatch lists are not searched out in step 105, step 106 is performed to determine whether only one dispatch list is searched out or not. When no dispatch list is searched out in step 106, the system can inform the caller no dispatching car record in step 114. That is, the dispatching company does not provide any service to the caller. At this time, step 115 is performed. In step 115, the system provides several selection items to the passengers. For example, the system will ask the caller whether or not uses another telephone number to process a new search. The system will ask the caller whether or not needs another service. Or, the system will ask the caller whether or not ends this process. When the caller uses another telephone number to process a new search in step 115, step 103 is performed again to search a dispatch list related to the new telephone number. That is, a code of this passenger is gathered based on the passenger's new telephone number. Then, dispatch list recording this code of this passenger is searched out from a plurality of dispatch lists. On the other hand, when the passenger selects to communicate with an operator to help him, an operator of this dispatch company can talk with him directly in step 112.

On the other hand, when a dispatch list is searched out in step 106, step 107 is performed. The telephone number of the taxi driver recorded in the selected dispatch list is called. In an embodiment, the code of the taxi driver is gathered, then, the telephone number is gathered based on the code of the taxi driver. In step 108, a communication link is built between the caller and the taxi driver.

When a communication link is built between the caller and the taxi driver in step 108, step 109 is performed to determine whether the connection of the communication link is successful or not. When the connection of the communication link is successful, the caller can talk with the driver in step 110. In another embodiment, the system can record the talk to ensure a good service quality. On the other hand, when the connection of the communication link is not successful in step 109, the system provides several selection items to the passengers in step 111. For example, the system will ask the caller whether or not to wait for the connection of the communication link. The system will ask the caller whether or not to leave a message. Or, the system will ask the caller whether or not to end this process. When the passenger selects to communicate with an operator to help him, an operator of this dispatch company can talk with him directly in step 112.

It is noticed that after a passenger calls a taxi and the taxi has arrived at a position to pick up this passenger, the taxi driver can use the above method to communicate with the passenger to tell the passenger he has arrived at this arranged position. Or, the taxi driver also can use the above method to leave message to the passenger to tell the passenger he has arrived at this arranged position. On the other hand, the passenger can use the above method to communicate with the taxi driver to ask whether or not he has arrived at this arranged position.

Figure 2:
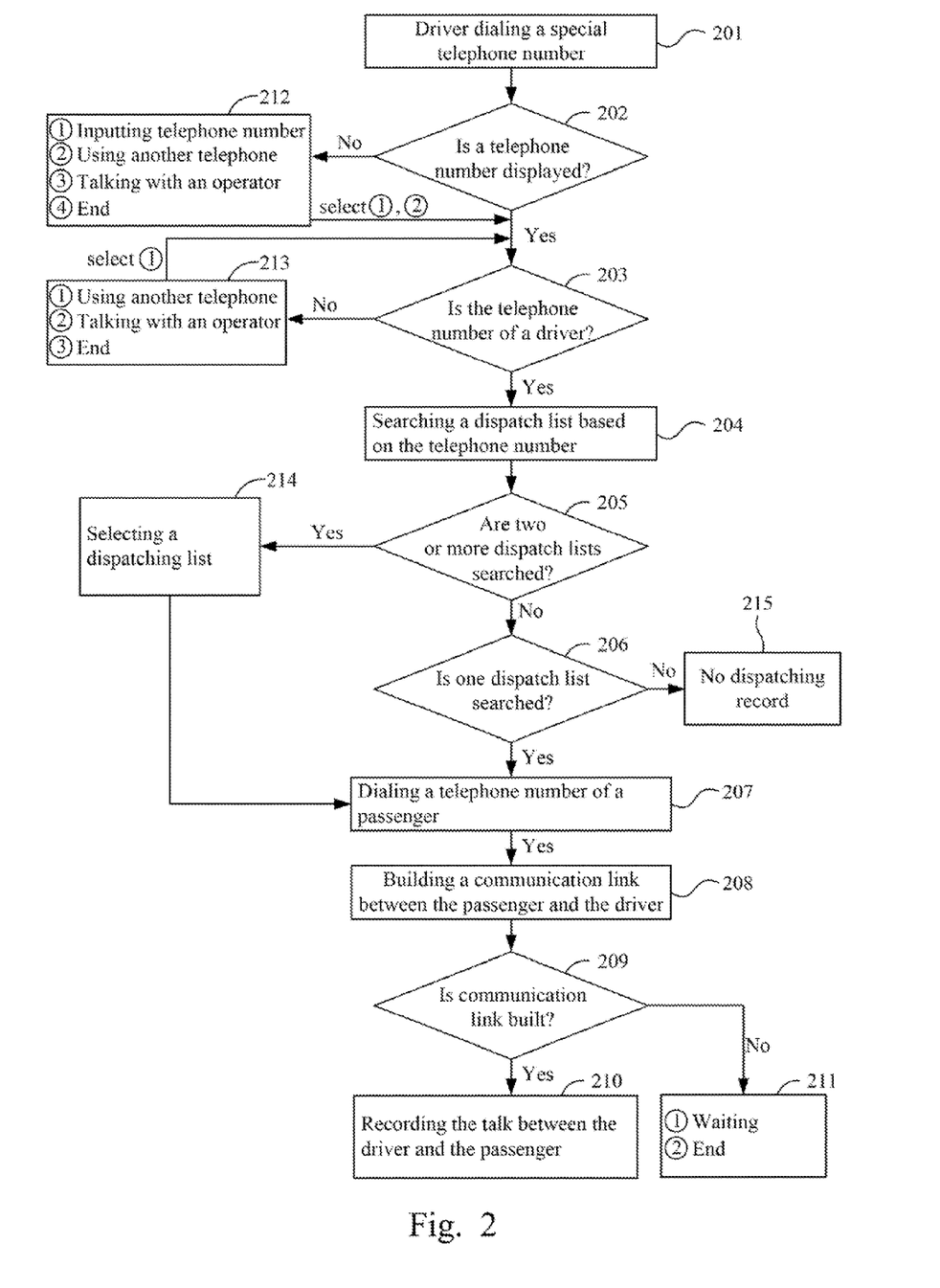
FIG. 2 is a flowchart of a driver to build a communication with a passenger.

FIG. 2 is a flowchart of a driver to build a communication with a passenger. This flow chart is to describe how to build a communication between a taxi driver and a passenger automatically when this taxi driver wants to communicate with the passenger after a dispatching company has arranged a taxi driver to the passenger. On the other hand, a dispatch list is generated by the dispatching company after this dispatching company dispatches a taxi to serve a passenger. This dispatching list records a dispatching result, a code of this passenger, a code of this dispatched taxi driver, a time to generate this dispatch list, a telephone number of this passenger, a telephone of the dispatched taxi driver, a position to pick up this passenger, a predetermined time to pick up this passenger and so on. In an embodiment, the code of the passenger is a telephone number of the passenger, and the code of the dispatched taxi driver is a telephone number of the dispatched taxi driver.

In step 201, when a taxi driver wants to communicate with a passenger, this taxi driver can dial a special telephone number. This special telephone number is set, for example, by this dispatching company to provide taxi drivers who are dispatched by this dispatching company to communicate with passengers. Moreover, this special telephone number and the telephone number for a passenger calling a taxi of this dispatching company can be different. In another embodiment, this special telephone number and the telephone number for a passenger calling a taxi of this dispatching company can be the same. Accordingly, the system distinguishes a call that is from the, passenger or from the taxi driver based on the caller telephone number. In another embodiment, the special telephone number for the taxi drivers and the special telephone number for the passengers are the same. Accordingly, the system distinguishes a call that is from the passenger or from the taxi driver based on the caller telephone number.

Next, in step 202, a detection process is performed to determine whether a telephone number of a caller is displayed in a communication system of a dispatching company. That is, a code of this taxi driver is gathered based on the taxi driver's telephone number. Then, the dispatch list recording this code of this taxi driver is searched from a plurality of dispatch lists. For example, a communication system detects whether a caller information includes a telephone number. Because this detection process is performed by a communication system of the dispatching company, the passenger can not know the taxi driver's telephone number.

When the caller information includes a telephone number in step 202, a determination process is performed to determine whether or not the taxi driver belongs to the dispatching company based on the telephone number in step 203. In contrast, when the caller information does not include a telephone number in step 202, the system provides the following selection items to the taxi drivers in step 213. For example, the taxi driver can manually input his telephone number to the system, the taxi driver can use another telephone that can display telephone number to communicate with the dispatching company. The taxi driver can communicate with an operator to require service. Or, the taxi driver can end this call.

When the taxi driver selects to manually input his telephone number to the system in step 212, the step 203 is performed to determine whether or not the taxi driver belongs to the dispatching company based on the new telephone number. In contrast, when step 203 determines that the taxi driver does not belong to the dispatching company, the system provides the following selection items to the taxi drivers in step 213. For example, the taxi driver can manually input his telephone number to the system. The taxi driver can communicate with an operator to require service. Or, the taxi driver can end this call.

In step 204, a dispatch list related to the telephone number is searched. In another embodiment, the method of searching dispatch list further comprises to mark the dispatching list code in the passenger's record when the dispatching list is generated or to mark the dispatching list code in the taxi driver's record when the dispatching list is generated to improve the searching velocity. That is, a code of this taxi driver is gathered based on the taxi driver's telephone number. Then, dispatch list recording this code of this taxi driver is searched from a plurality of dispatch lists.

Next, in step 205, a determination process is performed to determine whether two or more dispatch lists are searched out or not. When a taxi driver performs taxi service many times, many dispatch lists are generated because each time taxi service can generate a dispatch list. Accordingly, it is possible for the system to search out two or more dispatch lists related to the taxi driver code in step 205. Accordingly, when step 205 determines two or more dispatch lists are searched out, step 214 is performed to provide taxi drivers input a s dispatch list number to select one of the dispatch lists. In step 207, when the caller selects one of the dispatch lists, the telephone number of the passenger recorded in the selected dispatch list is called. In an embodiment, the code of the passenger is gathered, then, the telephone number is gathered based on the code of the passenger. In step 208, a communication link is built between the passenger and the taxi driver. In another embodiment, the system can pronounce the position to pick up this passenger or the time to pick up this passenger to provide the taxi driver to select one of the dispatch lists.

On the other hand, when two or more dispatch lists are not searched out in step 205, step 206 is performed to determine whether only one dispatch list is searched out or not. When no dispatch list is searched out in step 206, the system can inform the taxi driver no dispatching record in step 215. That is, the dispatching company does not dispatch the taxi driver to provide service to passengers. On the other hand, when a dispatch list is searched out in step 206, step 207 is performed. The telephone number of the passenger recorded in the selected dispatch list is called. Then, in step 208, a communication link is built between the passenger and the taxi driver.

When a communication link is built between the passenger and the taxi driver in step 208, step 209 is performed to determine whether the connection of the communication link is successful or not. When the connection of the communication link is successful, the taxi driver can talk with the passenger in step 210. In another embodiment, the system can record the talk to ensure a good service quality. On the other hand, when the connection of the communication link is not successful in step 209, the system provides several selection items to the passengers in step 211. For example, the system will ask the taxi driver whether or not to wait for the connection of the communication link. The system will ask the taxi driver whether or not leave message. Or, the system will ask the taxi driver whether or not end this process.

FIG. 3 illustrates an apparatus for building a communication link between the passengers and the taxi drivers. The apparatus 300 includes a search server 301, a server 302 for building communication link, a passenger database 303, a taxi driver database 304, a dispatch list database 305, a communication system 306 for taxi drivers and a communication system 307 for passengers.

The taxi drivers and the passengers can link to the search server 301 through the communication system 306 and the communication system 307 respectively. The passenger database 303 at least stores the telephone numbers and the codes of the passengers. The taxi driver database 304 at least stores the telephone numbers and the codes of the taxi drivers. The dispatch list database 305 at least stores a plurality of dispatch lists, wherein each dispatch list records a dispatching state, a code of this passenger, a code of this dispatched taxi driver, a time to generate this dispatch list, a position to pick up this passenger, a predetermined time to pick up this passenger and the real time of the dispatched taxi arrived and mark. The passenger database 303, the taxi driver database 304 and the dispatch list database 305 can be integrated together to form a database. In this case, each dispatch list can record a dispatching result, a code of this passenger, a code of this dispatched taxi driver, a time to generate this dispatch list, a telephone number of this passenger, a telephone of the dispatched taxi driver, a position for picking up this passenger and a predetermined time for picking up this passenger.

The search server 301 can search a corresponding detailed taxi driver information from a taxi driver database 304 based on a taxi driver telephone number. For example, a code of a taxi driver is gathered based on the taxi driver's telephone number. Then, a dispatch list recording this code of this taxi driver is searched out from the dispatch list database 305. A code of a passenger recorded in the dispatch list is gathered. Then, a telephone number related to the code of the passenger is searched out from the passenger database 303. The server 302 dials the telephone number of the passenger to build a communication link between the passenger and the taxi driver.

The search server 301 can search a corresponding detailed passenger information from a passenger database 303 based on a passenger telephone number. For example, a code of a passenger is gathered based on the passenger's telephone number. Then, a dispatch list recording this code of this passenger is searched out from the dispatch list database 305. A code of a taxi driver recorded in the dispatch list is gathered. Then, a telephone number related to the code of the taxi driver is searched out from the taxi driver database 304. The server 302 dials the telephone number of the taxi driver to build a communication link between the passenger and the taxi driver.

According to this apparatus 300, when a passenger wants to communicate with a taxi driver, the passenger can link to the search server 301 through the communication system 307. The search server 301 can search a corresponding detailed passenger information from a passenger database 303 based on a passenger telephone number. A code of a passenger is gathered based on the passenger's telephone number. Then, a dispatch list recording this code of this passenger is searched out from the dispatch list database 305. Then, a telephone number related to the code of the taxi driver is searched out from the taxi driver database 304. The server 302 dials the telephone number of the taxi driver to build a communication link between the passenger and the taxi driver.

On the other hand, when a taxi driver wants to communicate with a passenger, the taxi driver can link to the search server 301 through the communication system 306. The search server 301 can search a code of a taxi driver from a taxi driver database 304 based on a taxi driver telephone number. Then, a dispatch list recording this code of this taxi driver is searched out from the dispatch list database 305. A code of a passenger recorded in the dispatch list is gathered. Then, a telephone number related to the code of the passenger is searched out from the passenger database 303. The server 302 dials the telephone number of the passenger to build a communication link between the passenger and the taxi driver.

The invention can provide the following advantages. It is not necessary for a passenger to communicate with a taxi driver through an operator of the dispatching company. It is also not necessary for a taxi driver to communicate with a passenger through an operator of the dispatching company. It is also not necessary for a passenger to memorize a code of a taxi driver to communicate with the taxi driver. Therefore, the method can save the time of the passenger and taxi driver and reduce the manpower requirement. Moreover, because the communication link between the passenger and the taxi driver are built automatically, the private matter, such as the telephone number, can be protected. On the other hand, when a communication link is built between the passenger and the taxi driver, an automatic recording process is started to record the talk between the passenger and the taxi driver to ensure a service quality.

An arriving signal receiver 308 receives an arriving signal of a customer service, such as the taxi driver. The receiver 308 receives the arriving signal from an external dispatching system 309. In another embodiment, the dispatch list in the dispatch list database 305 stores the content of whether or not a taxi driver arriving the assigned position. The receiver 308 also can gather the arriving signal from the dispatch list database 305. The search server 301 can gather the arriving signal from the receiver 308 -and extract the corresponding dispatch list from the database 305 based on the arriving signal. The search server 301 can search a corresponding passenger code from the dispatch list. Then, a telephone number related to the code of the passenger is searched out from the passenger database 303. The server 302 dials the telephone number of the passenger to build a communication link between the passenger and the taxi driver.

In another embodiment, a customer service of a dispatching company communicates with a client just to tell the client that he has arrived. In this case, it is not necessary for the customer service to really talk with the client. Therefore, the invention gathers a signal that is sent from a communication apparatus of the customer service to the external dispatching system when he arrives a assigned position. This signal will renew the content of whether or not arrived the assigned position in dispatch list. This signal will trigger the server 302 uses a special telephone number to dial to the client to build a communication link between the customer service and the client. Before the client answers the phone, the communication link is cut but the special telephone number is displayed in the communication apparatus of the client. That is, the special telephone number is used as an information to tell the client that the customer service, has arrived. When the client recall the special telephone number, the information that the customer service has arrived is informed to the client and a selection of building a communication link with the customer service is provided to the client.

This invention provides a method to build a communication link between a client and a customer service of the dispatching company. The dispatching company has a plurality of dispatch list, each dispatch list records a code of a client and a code of a customer service that provides service to the client. The method comprises gathering a signal of the customer service arriving the assigned position, wherein the signal is sent from a communication apparatus of the customer service to an external dispatching system to renew the the content of whether or not arrived the assigned position in dispatch list when he arrives a assigned position. This signal will trigger the server uses a special telephone number to dial to the client to build a communication link between the customer service and the client. Before the client answers the phone, the communication link is cut but the special telephone number is displayed in the communication apparatus of the client. That is, the special telephone number is used as an information to tell the client that the customer service has arrived. When the client recall the special telephone number, the information that the customer service has arrived is informed to the client and a selection of building a communication link with the customer service is provided to the client.

This invention also provides a method to build a communication link between a client and a customer service of the dispatching company. The dispatching company has a plurality of dispatch list, each dispatch list records a code of a client and a code of a customer service that provides service to the client. The method comprises gathering a signal of the customer service arriving the assigned position, wherein the signal is sent from a communication apparatus of the customer service to an external dispatching system to renew the the content of whether or not arrived the assigned position in dispatch list when he arrives an assigned position. Then, the corresponding dispatch list is extracted from the database based on the arriving signal and a corresponding client code from the dispatch list is searched. A telephone number related to the code of the client is searched out from the passenger database. The server dials the telephone number of the client to build a communication link between the client and the customer service.

In an embodiment, the telephone number of the client is dialed, then, the telephone number of the customer service is dialed to build the communication link.

In another embodiment, the telephone number of the client and the telephone number of the customer service are dialed at the same time to build the communication link.

Furthermore, for saving the communication cost, the invention also provides that a server uses a special telephone number to dial to the client to build a communication link between the customer service and the client. Before the client answers the phone, the communication link is cut but the special telephone number is displayed in the communication apparatus of the client. That is, the special telephone number is used as an information to tell the client that the customer service has arrived. When the client recall the special telephone number, the information that the customer service has arrived is informed to the client and a selection of building a communication link with the customer service is provided to the client. When the communication link between the client and the customer service is built, the method further comprises to record the talk content to improve the service.

Moreover, the code of the dispatch list is also stored in the communication apparatus of the customer service. When the signal of the customer service arriving the assigned position! is sent to an external dispatching system, this code of the dispatch list is also sent to the external dispatching system. Then the dispatch list can be searched based on the code. On the other hand, the dispatching list code also can be marked in the passenger's record when the dispatching list is generated. Because the code has been marked in the passenger's record, the code and the telephone number of the customer service can be searched quickly.

Although the present invention has been described in considerable detail with reference to certain embodiments thereof, other embodiments are possible. Therefore, it will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A method to build a communication link between a client and a taxi driver that has been assigned to provide service to the client by a dispatching company, wherein the dispatching company has a plurality of dispatch list, each dispatch list records a code of a client and a code of a taxi driver who provides service to the client, comprising:
   gathering a telephone number of a client by a search server when the client dials a service telephone number of the dispatching company;
   based on the telephone number to gather a code of the client by the search server;
   based on the code of the client to search a dispatch list from the plurality of dispatch lists by the server;
   gathering a code of the taxi driver recorded in the dispatch list by the search server;
   based on the code of the taxi driver to gather a telephone number of the taxi driver by the search server; and
   dialing the telephone number of the taxi driver to build a communication link between the client and the taxi driver by a building communication link server for the client to talk with the taxi driver.

2. The method to build a communication link of claim 1, wherein based on the code of the client to search a dispatch list from the plurality of dispatch lists further comprises to mark the code in a record of the client when the dispatching list is generated.

3. The method to build a communication link of claim 1, wherein the service telephone number is different from a telephone number that a client dials to the dispatching company to require a taxi driver to provide service.

4. The method to build a communication link of claim 1, wherein the service telephone number is the same as a telephone number that a client dials to the dispatching company to require a taxi driver to provide service, further comprising:
   informing the client to communicate with the taxi driver when one of the plurality of dispatch lists corresponds to the telephone number of the client.

5. The method to build a communication link of claim 1, wherein the service telephone number is the same as a telephone number that a taxi driver dials to the dispatching company, further comprising:
   based on a telephone number received by the dispatching company to distinguish that a client or a taxi driver wants to communicate with the dispatching company.

6. The method to build a communication link of claim 1, wherein gathering a telephone number of a client further comprises:
   informing the client to input a telephone number of the client.

7. The method to build a communication link of claim 1, wherein the code of the client is a telephone number of the client, and the code of the taxi driver is a telephone number of the taxi driver.

8. The method to build a communication link of claim 1, wherein the telephone number of the client is not recorded in any one of the dispatch lists, further comprises:
   informing the client to input another telephone number of the client.

9. The method to build a communication link of claim 1, wherein each dispatch list further records a position for a taxi driver providing service to a client and a time or a taxi driver providing service to a client.

10. The method to build a communication link of claim 8, wherein when two or more dispatch lists of the plurality of dispatch lists are searched out, further comprises:
    providing information of a position for the taxi driver providing service to the client or a time or the taxi driver providing service to the client to the client to select one of the two or more dispatch lists.

11. The method to build a communication link of claim 1 further comprising to prounce the code of the taxi driver to the client before dialing the telephone number of the taxi driver to build a communication link between the client and the taxi driver.

12. The method to build a communication link of claim 1, further comprising:

recording the talk between the client and the taxi driver after a communication link is built between the client and the taxi driver.

13. A method to build a communication link between a client and a taxi driver that has been assigned to provide service to the client by a dispatching company, wherein the dispatching company has a plurality of dispatch lists, each dispatch list records a code of a client and a code of a taxi driver who provides service to the client, comprising:
   gathering a telephone number of a taxi driver by a search server when the taxi driver dials a service telephone number of the dispatching company;
   based on the telephone number of the taxi driver to gather a code of the taxi driver by the search server;
   based on the code of the taxi driver to search a dispatch list from the plurality of dispatch lists by the search server;
   gathering a code of a client recorded in the dispatch list by the search server;
   based on the code of the client to gather a telephone number of the client by the search server; and
   dialing the telephone number of the client to build a communication link between the client and the taxi driver by a building communication link server for the taxi driver to talk with the client.

14. The method to build a communication link of claim 13, wherein based on the code of the client to search a dispatch list from the plurality of dispatch lists further comprises to mark the code in a record of the client when the dispatching list is generated.

15. The method to build a communication link of claim 13, wherein the service telephone number is different from a telephone number that a client dials to the dispatching company to require a taxi driver to provide service.

16. The method to build a communication link of claim 13, wherein the service telephone number is the same as a telephone number that a client dials to the dispatching company to require a taxi driver to provide service, further comprising:
   based on a telephone number received by the dispatching company to distinguish that a client or a taxi driver wants to communicate with the dispatching company.

17. The method to build a communication link of claim 13, wherein the service telephone number is same as a telephone number that a taxi driver dials to the dispatching company, further comprising:
   based on a telephone number received by the dispatching company to distinguish that a client or a taxi driver wants to communicate with the dispatching company.

18. The method to build a communication link of claim 13, wherein gathering a telephone number of a taxi driver further comprises:
   informing the taxi driver to input a telephone number of the Client.

19. The method to build a communication link of claim 13, wherein further comprises:
   determining a telephone number received by the dispatching company whether or not belongs to a taxi driver of the dispatching company.

20. The method to build a communication link of claim 13, wherein when the telephone number received by the dispatching company does not belong to a taxi driver of the dispatching company, further comprises:
   informing the taxi driver to input another telephone number of the taxi driver.

21. The method to build a communication link of claim 13, wherein each dispatch list further records a position for a taxi driver providing service to a client and a time or a taxi driver providing service to a client.

22. The method to build a communication link of claim 21, wherein when two or more dispatch lists of the plurality of dispatch lists are searched out, further comprises:
   providing information of a position for the taxi driver providing service to the client or a time or the taxi driver providing service to the taxi driver to the client to select one of the two or more dispatch lists.

23. The method to build a communication link of claim 13, further comprising:
   recording the talk between the client and the taxi driver after a communication link is built between the client and the taxi driver.

24. A method to build a communication link between a client and a taxi driver that has been assigned to provide service to the client by a dispatching company, wherein the dispatching company has a plurality of dispatch lists, each dispatch list records a code of a client and a code of a taxi driver who provides service to the client, comprising:
   gathering a signal of a taxi driver arriving an assigned position, wherein the signal is sent from a communication apparatus of the taxi driver to an external dispatching system;
   gathering a dispatch list based on the signal by a search server;
   gathering a code of the client in the dispatch list by the search server;
   based on the code of the client to gather a telephone number of the client by the search server; and
   dialing the telephone number of the client to build a communication link between the client and the taxi driver by a building communication link server for the customer to talk with the client.

25. The method to build a communication link of claim 24, wherein gathering a signal of a taxi driver is from the external dispatching system or from a database that stores the dispatch list whose content is renewed by the signal.

26. The method to build a communication link of claim 24, wherein the code of the dispatch list is stored in a communication apparatus of the taxi driver, when the signal is sent to the external dispatching system, the code of the dispatch list is also sent to the external dispatching system.

27. The method to build a communication link of claim 24, wherein based on the code of the client to search a dispatch list from the plurality of dispatch lists further comprises to mark the code in a record of the client when the dispatching list is generated.

28. The method to build a communication link of claim 24, wherein the telephone number of the client is dialed, then, the telephone number of the taxi driver is dialed or the telephone number of the client and the telephone number of the taxi driver are dialed at the same time to build the communication link.

29. The method to build a communication link of claim 24, wherein before the client answers the phone, the communication link is cut but a special telephone number is displayed in a communication apparatus of the client to tell the client that the taxi driver has arrived.

30. The method to build a communication link of claim 29, wherein when the client recall the special telephone number, the information that the taxi driver has arrived is informed to the client and a selection of building a communication link with the taxi driver is provided to the client.

31. The method to build a communication link of claim 29, wherein after a communication link between the client and the taxi driver is built further comprises to record a talk content between the client and the taxi driver.

32. An apparatus to build a communication link between a client and a taxi driver that is assigned to serve the client by a dispatching company, comprising:
- a communication system for receiving a call;
- a search server;
- a building communication link server; and
- a database having a plurality of dispatch list of the dispatching company, each dispatch list records at least two codes of a client and a code of a taxi driver who provides service to the client,
- wherein the search server gathers a telephone number of a caller when the caller calls the dispatching company, and from the database to gather a code of the caller based on the telephone number, and search a dispatch list from the plurality of dispatch lists based on the code of the caller, and gather a code of a corresponding person recorded in the dispatch list, and gather a telephone number of the corresponding person;
- wherein the building communication link server dials the telephone number of the corresponding person to build a communication link between the caller and the corresponding person for the caller to talk with the corresponding person.

33. The apparatus to build a communication link of claim 32, wherein each dispatching list in the database records a dispatching state, a code and a telephone number of the client, a code and a telephone number of the taxi driver, a time of requiring service, a time to provide service, a position to provide service, wherein the dispatching state is renewed by a external dispatching system.

34. The apparatus to build a communication link of claim 32, wherein the caller is a client and the corresponding person is a taxi driver.

35. The apparatus to build a communication link of claim 32, wherein the caller is a taxi driver and the corresponding person is a client.

36. The apparatus to build a communication link of claim 32, wherein the code of the client is a telephone number of the client, and the code of the taxi driver is a telephone number of the taxi driver.

37. The apparatus to build a communication link of claim 32, wherein each dispatch list further records a position for a taxi driver providing service to a client and a time or a taxi driver providing service to a client when two or more dispatch lists of the plurality of dispatch lists are searched out, further comprises to provide information of a position for the taxi driver providing service to the caller or a time or the taxi driver providing service to the client to the caller to select one of the two or more dispatch lists.

38. The apparatus to build a communication link of claim 32, further comprising a signal receiver, wherein the signal receiver receives a signal of the taxi driver arrived an assigned position, the search server extracts a corresponding dispatch list based on the signal to search a corresponding client code from the dispatch list, a telephone number related to the code of the client is searched out from the database, the building communication link server dials the telephone number of the client to build a communication link between the client and the taxi driver.

* * * * *